(12) United States Patent
Sugimoto et al.

(10) Patent No.: US 10,097,706 B2
(45) Date of Patent: Oct. 9, 2018

(54) INFORMATION PROCESSING APPARATUS

(71) Applicant: FUJI XEROX CO., LTD., Tokyo (JP)

(72) Inventors: Hideaki Sugimoto, Yokohama (JP);
Nozomi Noguchi, Yokohama (JP);
Shinichi Nakamura, Yokohama (JP);
Ayaka Ishihara, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/202,879

(22) Filed: Jul. 6, 2016

(65) Prior Publication Data

US 2017/0279984 A1    Sep. 28, 2017

(30) Foreign Application Priority Data

Mar. 22, 2016 (JP) ................. 2016-057622

(51) Int. Cl.
| H04N 1/00 | (2006.01) |
| G06F 3/0485 | (2013.01) |
| G06F 3/0482 | (2013.01) |
| H04N 1/32 | (2006.01) |

(52) U.S. Cl.
CPC ....... *H04N 1/00413* (2013.01); *G06F 3/0482* (2013.01); *G06F 3/04855* (2013.01); *H04N 1/0048* (2013.01); *H04N 1/00411* (2013.01); *H04N 1/00427* (2013.01); *H04N 1/00474* (2013.01); *H04N 1/00925* (2013.01); *H04N 1/32069* (2013.01); *H04N 1/32096* (2013.01); *H04N 2201/0093* (2013.01); *H04N 2201/0094* (2013.01); *H04N 2201/0098* (2013.01)

(58) Field of Classification Search
CPC ........ H04N 1/00413; H04N 2201/0093; G06F 3/04855
See application file for complete search history.

(56) References Cited

U.S. PATENT DOCUMENTS

| 2002/0126146 A1 | 9/2002 | Burns et al. |
| 2003/0058478 A1* | 3/2003 | Aoki ............... H04M 1/274525 358/402 |
| 2005/0102634 A1 | 5/2005 | Sloo |
| 2006/0132831 A1 | 6/2006 | Iwasaki et al. |
| 2007/0047006 A1* | 3/2007 | Sakai .................... G06F 3/1207 358/400 |
| 2007/0078631 A1* | 4/2007 | Ariyoshi ............. G06F 19/3406 702/189 |

(Continued)

FOREIGN PATENT DOCUMENTS

JP    2014-026306 A    2/2014

OTHER PUBLICATIONS

Jul. 18, 2017 Search Report issued in European Patent Application No. 16182149.1.

*Primary Examiner* — Iriana Cruz
(74) *Attorney, Agent, or Firm* — Oliff PLC

(57) ABSTRACT

An information processing apparatus, includes a transmission unit that transmits information; a first display control unit that controls, when a plurality of recipients to transmit the information are designated, a display unit to display a first list including the plurality of recipients; and a second display control unit that controls the display unit to display recipient-related information related to the recipient included in the first list, in a case where the first list is unable to be fitted within a single screen of the display unit.

25 Claims, 11 Drawing Sheets

(56) References Cited

U.S. PATENT DOCUMENTS

| | | | |
|---|---|---|---|
| 2011/0087997 A1* | 4/2011 | Lee | G06F 3/0482 |
| | | | 715/830 |
| 2012/0023438 A1* | 1/2012 | Xia | G06F 3/0482 |
| | | | 715/783 |
| 2014/0293338 A1* | 10/2014 | Murakami | H04N 1/00413 |
| | | | 358/1.15 |
| 2015/0186338 A1 | 7/2015 | Mirra et al. | |
| 2015/0347873 A1 | 12/2015 | Tomiyasu et al. | |
| 2015/0378545 A1 | 12/2015 | Telang et al. | |
| 2017/0286419 A1* | 10/2017 | Tang | G06F 9/44 |

\* cited by examiner

| QUANTITY OF RECIPIENTS | TIME LIMIT |
|---|---|
| LESS THAN THRESHOLD Th1 | T1 |
| THRESHOLD Th1 OR MORE | T2(T1<T2) |

US 10,097,706 B2

INFORMATION PROCESSING APPARATUS

CROSS-REFERENCE TO RELATED APPLICATIONS

This application is based on and claims priority under 35 USC 119 from Japanese Patent Application No. 2016-057622 filed on Mar. 22, 2016.

BACKGROUND (i) Technical Field

The present invention relates to an information processing apparatus.

SUMMARY

In a first aspect of the present invention, an information processing apparatus includes: a transmission unit that transmits information; a first display control unit, that controls, when a plurality of recipients to transmit the information are designated, a display unit to display a first list including the plurality of recipients; and a second display control unit that controls the display unit to display recipient-related information related to the recipient included in the first list, in a case where the first list is unable to be fitted within a single screen of the display unit.

BRIEF DESCRIPTION OF THE DRAWINGS

The foregoing and additional features and characteristics of this invention will become more apparent from the following detailed descriptions considered with the reference to the accompanying drawings, wherein.

DETAILED DESCRIPTION

[1] Examples

Figure 1:
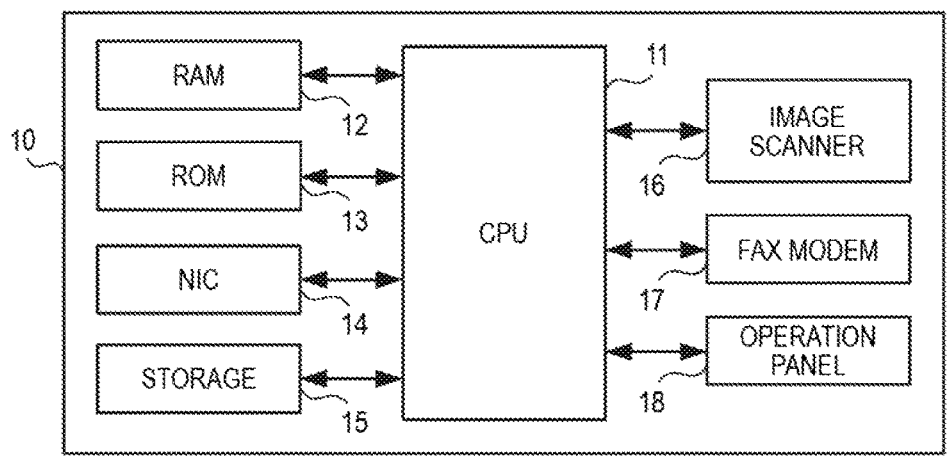
FIG. 1 is a diagram illustrating a hardware configuration of an image processing system according to an example.

[FIG. 1 illustrates a hardware configuration of an image processing system 10 according to an example. The image processing system 10 is an information processing apparatus which performs a process of reading an image from a medium such as a sheet and a process of transmitting the read image data to a recipient through a facsimile communication. The image processing system 10 is a computer which is provided with a CPU (Central Processing Unit) 11, a RAM (Random Access Memory) 12, a ROM (Read Only Memory) 13, an NIC (Network In Card) 14, a storage 15, an image scanner 16, a FAX modem 17, and an operation panel 18.

The CPU 11 controls operations of the respective units by executing a program stored in the ROM 13 or the storage 15 using the RAM 12 as a work area. The NIC 14 includes a communication circuit and performs communication to an external device. The storage 15 is a storage medium such as an HDD (Hard Disk Drive) or an SSD (Solid State Drive), and stores data and programs used in the control of the CPU 11.

The image scanner 16 is provided with an image sensor to optically read out an image displayed in a surface of a sheet. The image scanner 16 supplies image data indicating the read-out image to the CPU 11. The FAX modem 17 includes a communication circuit for performing the facsimile communication, and performs transmission of the image data to a recipient designated by a FAX number and reception of the image data which is transmitted to a recipient designated by a FAX number assigned to an own device. The operation panel 18 is provided with a display and a touch panel equipped in the screen of the display to display characters and images and receive an operation from a user.

The CPU 11 executes a program to control the respective units so that functions are realized as will be described below.

Figure 2:
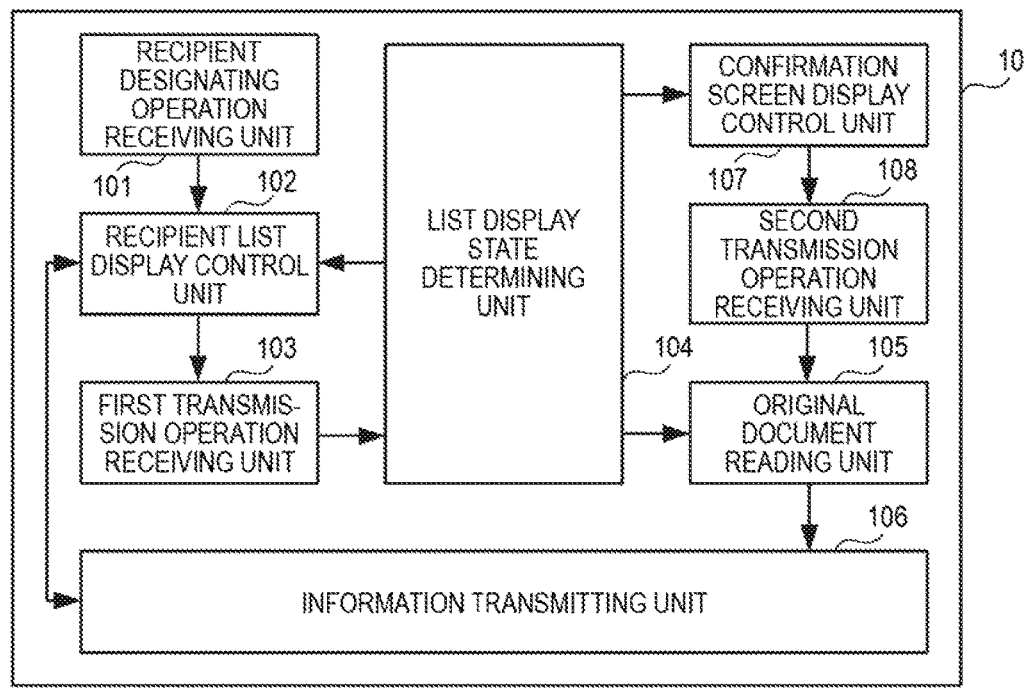
FIG. 2 is a diagram illustrating a functional configuration realized by the image processing system.

FIG. 2 illustrates a functional configuration to be realized by the image processing system 10. The image processing system 10 is provided with a recipient designating operation receiving unit 101, a recipient list display control unit 102, a first transmission operation receiving unit 103, a list display state determining unit 104, a original document reading unit 105, an information transmitting unit 106, a confirmation screen display control unit 107, and a second transmission operation receiving unit 108.

The recipient designating operation receiving unit 101 receives an operation of designating a recipient of a facsimile machine. For example, the recipient designating operation receiving unit 101 receives as an operation of designating a recipient, an operation of designating a FAX number using a ten-key pad or an operation of selecting a FAX number registered in advance in a telephone book. The recipient designating operation receiving unit 101 supplies the recipient designated through the receiving operation to the recipient list display control unit 102.

When plural recipients to transmit the information are designated, the recipient list display control unit 102 causes a display unit to display a list of the plural recipients. In the following, the recipient displayed by the recipient list display control unit 102 will be referred to as a "first recipient list". The first recipient list is an example of "first list" of the invention. The recipient list display control unit 102 is an example of "display control unit" of the invention. In this example, the recipient list display control unit 102 displays a list of names of the recipients and FAX numbers of the recipients to transmit the image data in the operation panel 18.

Figure 3A:
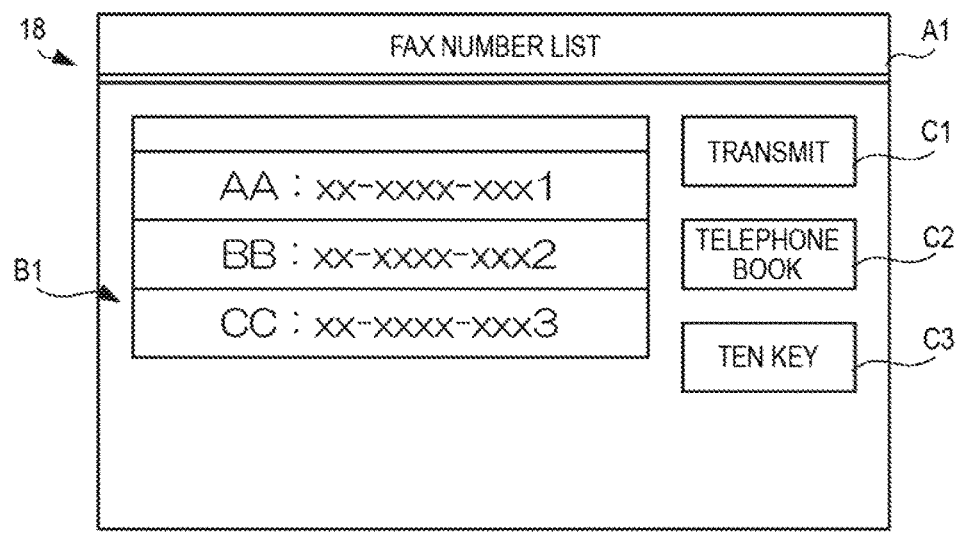
FIGS. 3A and 3B are diagrams illustrating an example of a displayed first recipient.
Figure 3B:
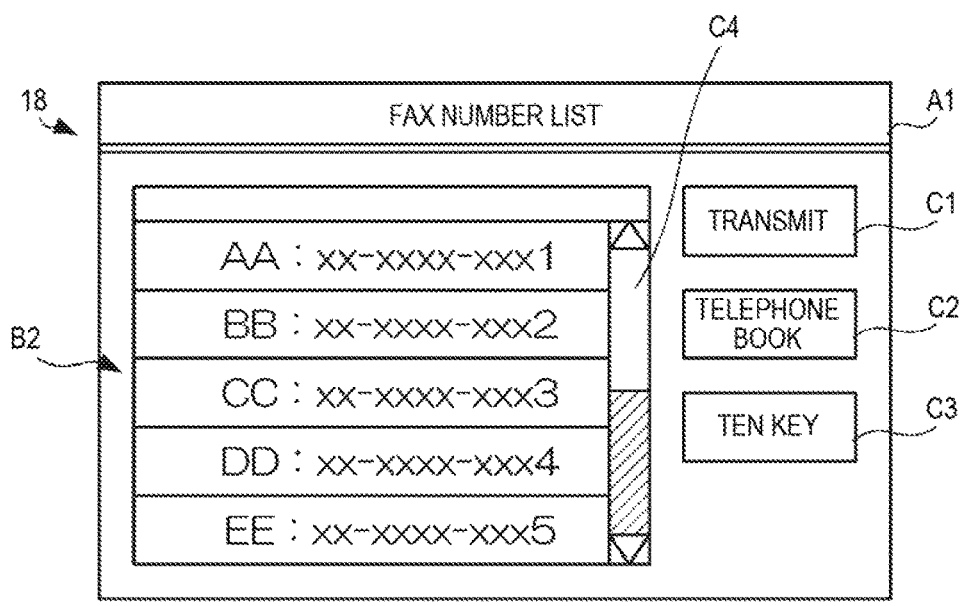

FIGS. 3A and 3B illustrate an example of the displayed first recipient list. In the example of FIGS. 3A and 3B, the recipient list display control unit 102 displays a recipient list screen A1 which includes a transmission operation image C1, a telephone book display operation image C2, and a ten-key display operation image C3 in the operation panel 18. The transmission operation image C1 is an image for receiving an operation of instructing the transmission of the information to the designated recipient. The telephone book display operation image C2 is an image for receiving an operation of displaying the telephone book where the recipient is registered. The ten-key display operation image C3 is an image for receiving an operation of displaying the image of the ten-key pad.

In addition, the recipient list display control unit 102 displays a first recipient list B1 including the number (three in this example) of FAX numbers, which is able to be fitted within a single screen of the operation panel 18 in the example of FIG. 3A. In the example of FIG. 3B, there is displayed a first recipient list B2 including the number (six or more in this example) of FAX numbers, which is unable to be fitted within a single screen of the operation panel 18. In the example of FIG. 3B, the recipient list display control unit 102 displays a scroll bar C4. In a case where the user operates the scroll, bar C4, the rest recipients are displayed. Each recipient is displayed by a name ("AA" in this example) of the recipient and a FAX number ("xx-xxxx-xxx1" in this example); for example, "AA; xx-xxxx-xxx1".

The recipient list display control unit 102 supplies position information (information indicating the position) of the transmission operation image C1 to the first transmission operation receiving unit 103. When the user operates the transmission operation image C1, the first transmission operation receiving unit 103 determines the operation as an operation with respect to the transmission operation image C1 on the basis of the supplied position information. The first transmission operation receiving unit receives the operation as an operation of instructing the transmission to the designated recipient. When receiving the operation, the first transmission operation receiving unit 103 informs the list display state determining unit 104 of the fact.

The list display state determining unit 104 determines whether the above-described first recipient list (that is, a list of the recipients displayed by the recipient list display control unit 102) can be fitted within a single screen of the display unit. When receives the notice from the first transmission operation receiving unit 103, the list display state determining unit 104 inquires of the recipient list display control unit 102 about the number of recipients included in the displayed first recipient list, for example. In a case where the number of recipients obtained in response is equal to or less than the number determined as, the number (five in this example) of recipients for a single screen, the list display state determining unit 104 determines that the first recipient list is able to be fitted within a single screen. In the case of exceeding the number, the list display state determining unit 104 determines that the first recipient list is unable to be fitted within a single screen.

The list display state determining unit 104 may determine that the first recipient list is able to fitted within a single screen if the recipient list display control unit 102 does not display the scroll bar, and may determine that the first recipient list is unable to be fitted within a single screen when the scroll bar is displayed. In a case where it is determined that the first recipient list is able to be fitted within a single screen, the list display state determining unit 104 informs the original document reading unit 105 of that. In a case where it is determined that the first recipient list is unable to be fitted within a sinnle screen, the list display state determining unit 104 informs the confirmation screen display control unit 107 of that.

In a case where an operation of instructing the transmission of the information is received, the original document reading unit 105 reads the original document set on the own device. For example, in a case where the determination that the first recipient list is able to be fitted within a single screen is informed from the list display state determining unit 104, it is considered that the operation of instructing the transmission of the information through a facsimile machine is received from the first transmission operation receiving unit 103. When receiving a notice from the list display state determining unit 104, the original document reading unit 105 reads the original document and supplies the image data indicating the image of the read original document to the information transmitting unit 106.

The information transmitting unit 106 has a function of transmitting the information and is an example of "transmission unit" of the invention. In a case where the operation of instructing the transmission of the information is received, the information transmitting unit 106 transmits the information. For example, in a case where the operation of instructing the transmission of the information through a facsimile machine is received from the first transmission operation receiving unit 103 in the above-described example, since the image data is supplied from the original document reading unit 105, the information transmitting unit 106 transmits the supplied image data to the recipient included in the first recipient list (that is, the designated recipient). When the image data is supplied front the original document reading unit 105, the information transmitting unit 106 inquires of the recipient list display control unit 102 about the recipient included in the first recipient list. The information transmitting unit 106 transmits the image data to the recipient obtained in response to the inquire.

In a case where the first recipient list is unable to be fitted within a single screen of the display unit, the confirmation screen display control unit 107 controls to display a list including more recipients included in the first recipient list on single screen than the first recipient list. In the following, the list of recipients displayed by the confirmation screen display control unit 107 is referred to as a "second recipient list". The second recipient list is an example of "second list" of the invention. The confirmation screen display control unit 107 is an example of "second display control unit" of the invention.

Figure 4:
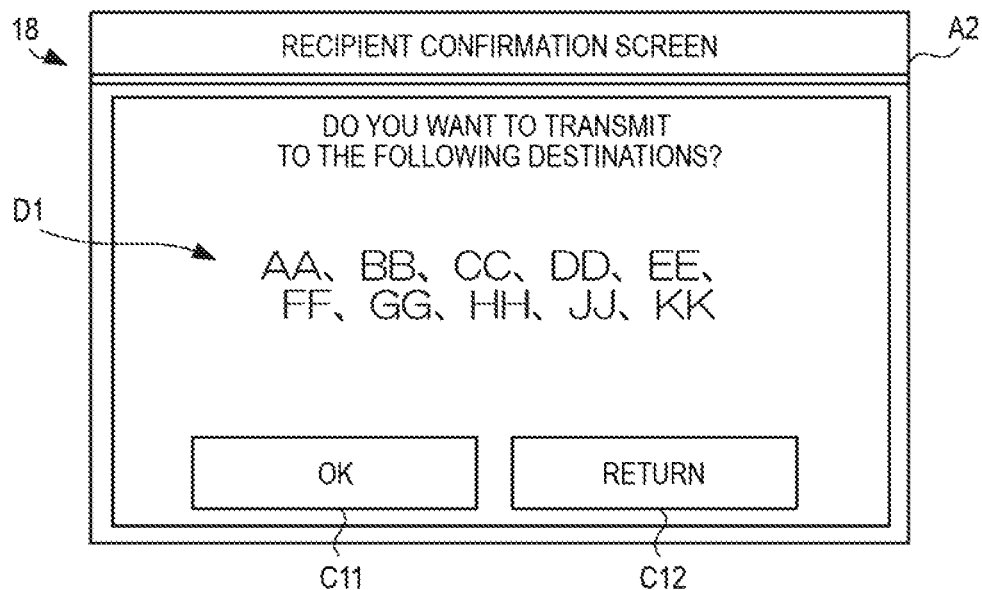
FIG. 4 is a diagram illustrating an example of a displayed second recipient list.

FIG. 4 illustrates an example of the displayed second recipient list. In the example of FIG. 4, the confirmation screen display control unit 107 displays a recipient confirmation screen A2 which includes character strings of "recipient confirmation screen" and "Do you transmit to the following recipients?", a second recipient list D1 including the names "AA, BB, CC, DD, EE, FF, GG, KK" of the recipients, a transmission operation image C11, and a cancel operation image C12 in the operation panel 18. The transmission operation image C11 is an image for receiving the operation of instructing the transmission of the information to the recipient included in the second recipient list D1 (that is, the designated recipient). The cancel operation image C12 is an image for receiving an operation of canceling the transmission of the information.

In this example, the confirmation screen display control unit 107 displays the second recipient list D1 that is shown to be fitted within a single screen of the operation panel 18 as illustrated in FIG. 4. In the example of FIG. 4, the confirmation screen display control unit 107 displays the recipients included in the first recipient list B2 illustrated in FIGS. 3A and 3B to the second recipient list D1 by omitting the character strings of the respective recipients, so that the second recipient list D1 is able to be fitted within a single screen. In addition, the confirmation screen display control unit 107 changes the arrangement of the recipients included in the first recipient list B2 to be included in the second recipient list D1, so that the second recipient list D1 is able to be fitted within a single screen. A method of fitting the second recipient list within a single screen is not limited to the above description.

Figure 5:
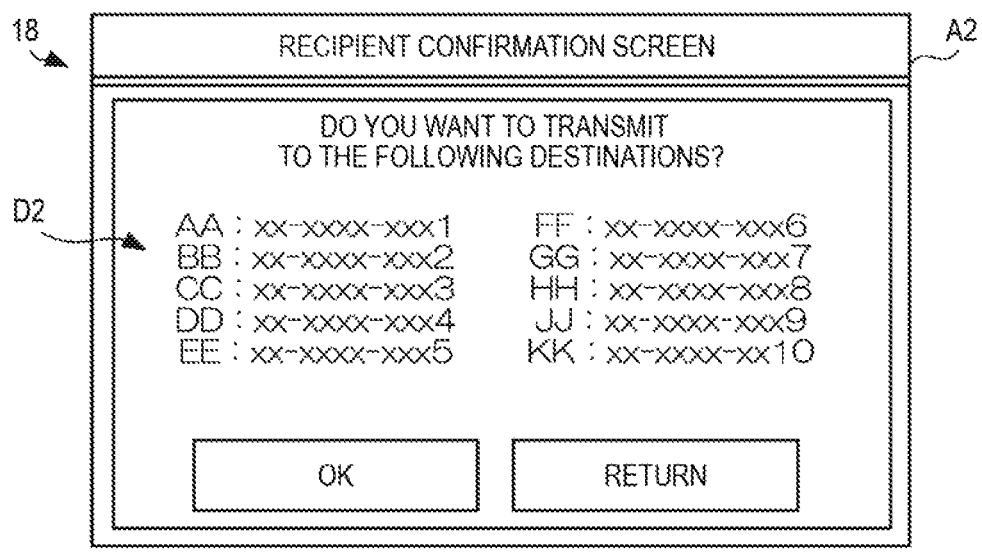
FIG. 5 is a diagram illustrating another example of the displayed second recipient list.

FIG. 5 illustrates another example of the displayed second recipient list. In the example of FIG. 5, the confirmation screen display control unit 107 displays the recipient confirmation screen A2 winch includes a second recipient list D2 including ten recipients "AA: xx-xxxx-xxx1", "BB: xx-xxxx-xxx2", "KK: xx-xxxx-xx10" in the operation panel 18. In this example, the confirmation screen display control unit 107 changes the arrangement of the recipients included in the first recipient list B2 and shrinks these recipients to be included in the second recipient list D2, and thus makes the second recipient list D2 to be fitted within a single screen.

When there is performed an operation on the cancel operation image C12 (an operation of touching the image), the recipient list display control unit 102 displays the first recipient list again. When there is performed an operation on the transmission operation image C11, the second transmission operation receiving unit 108 receives the operation as an operation of instructing the transmission to the designated recipient. When receiving the operation, the second transmission operation receiving unit 108 informs the fact to the original document reading unit 105. Hereinafter, as described above, the original document reading unit 105 reads the original document. The information transmitting unit 106 transmits the image data of the read original document to the designated recipient.

As described above, in a case where the first recipient list is able to be fitted within a single screen of the display unit and the operation onto the transmission operation image C1 illustrated in FIGS. 3A and 3B is performed, the information transmitting unit 106 considers that the operation of instructing the transmitting the information is received, and thus transmits the information (the image data of the read original document). On the other hand, in a case where the first recipient list is unable to be fitted within a single screen of the display unit and the operation onto the transmission operation image C1 is performed, the confirmation screen display control unit 107 displays the recipient confirmation screen. The transmission operation image C1 is an example of "first operator" of the invention.

In addition, the confirmation screen display control unit 107 displays the recipient confirmation screen and the transmission operation image C11 illustrated in FIGS. 4 and 5. Then, in a case where an operation onto the transmission operation image C11 is performed, the information transmitting unit 106 considers that the operation of instructing the transmission of the information is received and thus transmits the information. In addition, in a case where the first recipient list is able to be fitted within a single screen of the display unit, the confirmation screen display control unit 107 does not display the recipient confirmation screen.

According to the above configurations, the image processing system 10 performs an information transmission process of transmitting the information to the designated recipient.

Figure 6:
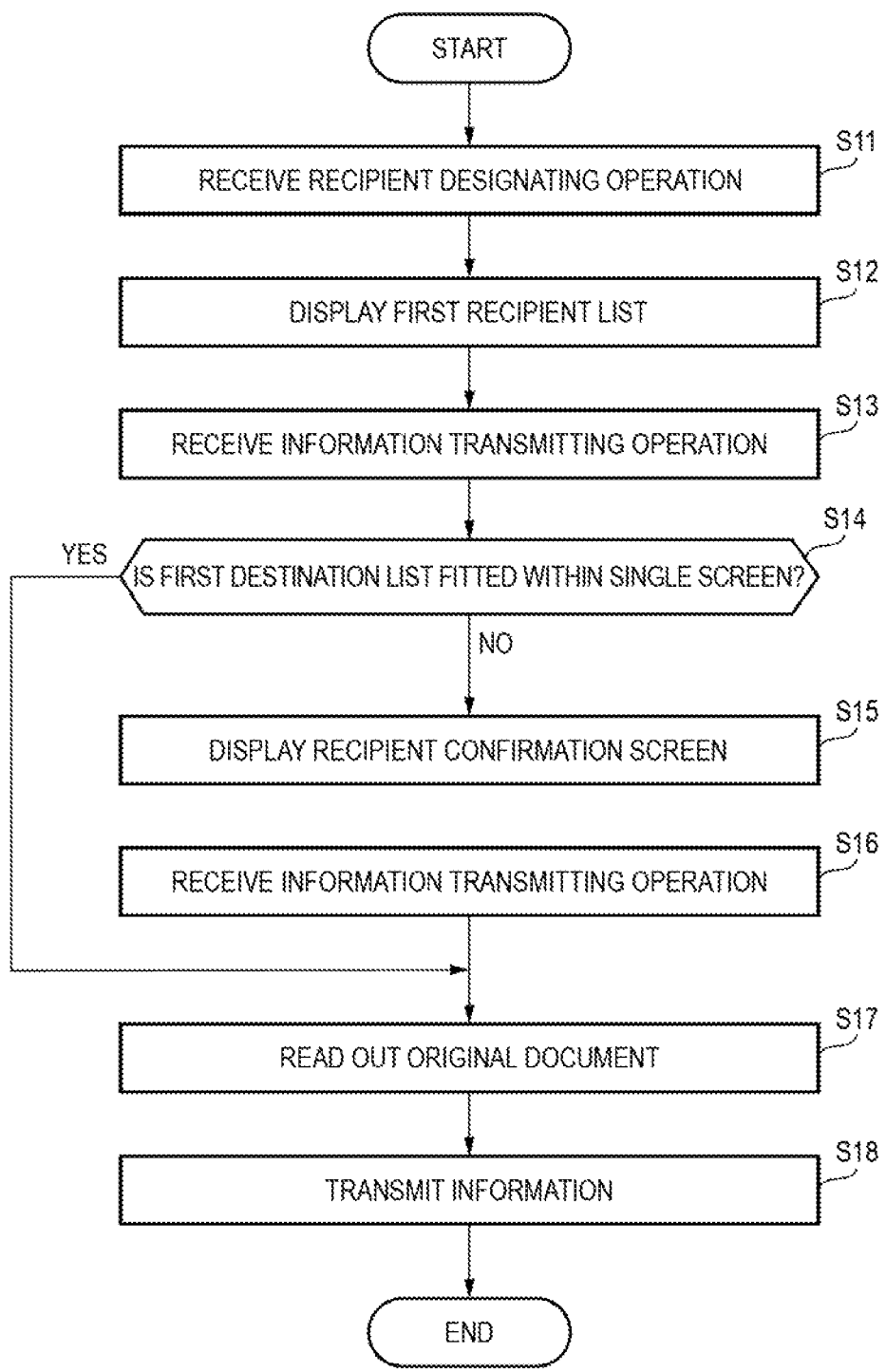
FIG. 6 is a diagram illustrating an example of an operational sequence of the image processing system in an information transmission process.

FIG. 6 illustrates an example of an operational sequence of the image processing system 10 in the information transmission process. The operational sequence is started by a user's operation causing to display the recipient list screen A1 illustrated in FIGS. 3A and 3B. First, the image processing system 10 (the recipient designating operation receiving unit 101) receives an operation of designating plural recipients using the ten-key pad or the telephone book (Step S11).

Next, the image processing system 10 (the recipient list display control unit 102) displays a first recipient list including the plural designated recipients (Step S12). Herein, when the user performs the operation on the transmission operation image C1 illustrated in FIGS. 3A and 3B, the image processing system 10 (the first transmission operation receiving unit 103) receives the operation as an operation of transmitting the information (Step S13). Subsequently, the image processing system 10 (the list display state determining unit 104) determines whether the displayed first recipient list is able to be fitted within a single screen (Step S14).

When it is determined that the first recipient list is unable to be fitted within a single screen in Step S14 (NO), the image processing system 10 (the confirmation screen display control unit 107) displays the recipient confirmation screen A2 illustrated in FIGS. 4 and 5 (Step S15). Herein, when the user performs the operation on the transmission operation image C11 included in the recipient confirmation screen A2, the image processing system 10 (the second transmission operation receiving unit 108) receives the operation as an operation of transmitting the information (Step S16).

Subsequently, the image processing system 10 (the original document reading unit 105) reads the original document set in the own device (Step S17). Even in a case where it is determined that the first recipient list is able to be fitted within a single screen (YES), the image processing system 10 (the original document reading unit 105) reads the original document (Step S17). Then, the image processing system 10 (the information transmitting unit 106) transmits the image data indicating the image of the read original document (Step S18).

In this example, in a case where the first recipient list is unable to be fitted within a single screen, the second recipient list is displayed. Therefore, the attention for confirming the recipient is called to the user in transmitting the information to the recipient included in a list which is unable to be displayed within a single screen. In addition, since the second recipient list includes more recipients on single screen than the first recipient, a lot of recipients are efficiently confirmed, as compared to a case where the recipients are confirmed only by the first recipient list. In addition, since the second recipient list is able to be fitted within a single screen, the entire recipients are easily confirmed, as compared to a case where the second recipient list is unable to be fitted within a single screen.

In addition, since the second recipient list is displayed by operating the operation image (the transmission operation image C1 illustrated in FIGS. 3A and 3B) for instructing the transmission of the information, the user is prompted to surely confirm the recipient. Since the information is transmitted by operating the transmission operation image C11 displayed together with the second recipient list, it save trouble when the transmission is instructed after confirming the recipient, as compared to a case where the transmission operation image C11 is not displayed. Since the second recipient list is unable to be displayed in a case where the first recipient list is able to be fitted within a single screen, the information is transmitted promptly, as compared with a case where the second recipient list is displayed.

[2] Modifications

Figure 7A:
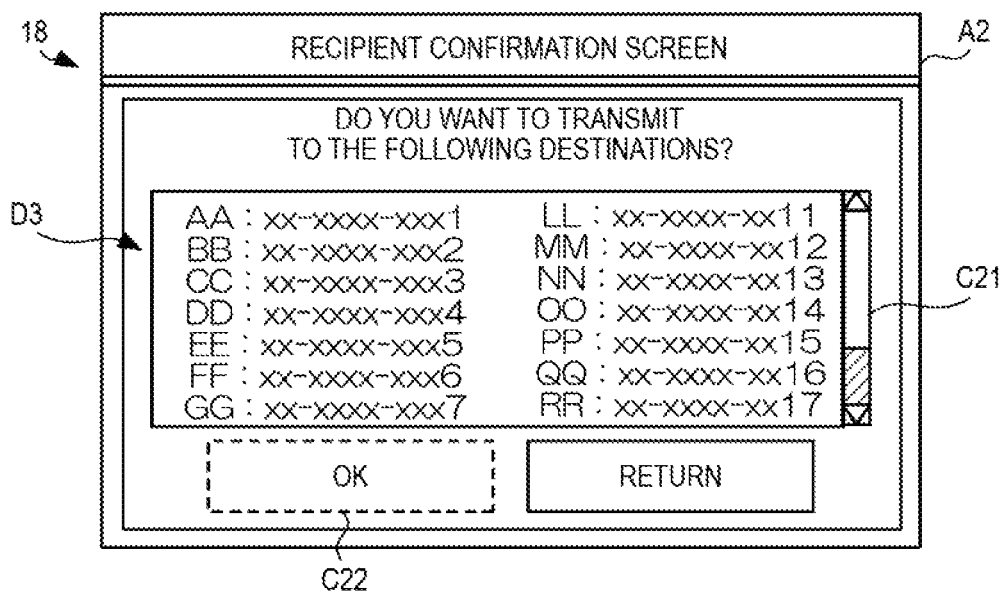
FIGS. 7A and 7B are diagrams illustrating an example of the second recipient list in a modified example.
Figure 7B:
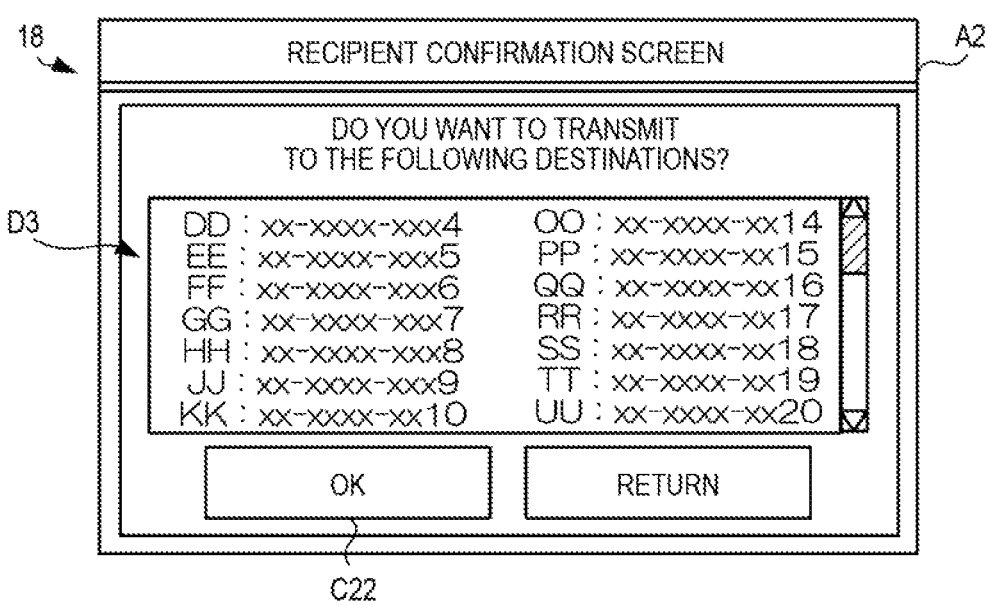

The above-described example is given as merely exemplary in the present invention and may be modified as follows. In addition, the example and the respective modifications may be combined as needed.
[2-1] Second Recipient List
The confirmation screen display control unit 107 has displayed the second recipient list to be fitted within a single screen in the example, but the invention is not limited thereto. The second recipient list unable to fit within a single screen may be displayed. In that case, the information ma be not transmitted until the entire second recipient list is displayed.
FIGS. 7A and 7B illustrate an example of the second recipient list which is displayed in this modified example. In the example of FIG. 7A, the confirmation screen display control unit 107 displays the recipient confirmation screen A2 which includes a second recipient list D3 unable to fit within a single screen, a scroll bar C21 for scrolling the second recipient list D3, and a transmission operation image C22 surrounded by the broken line in the operation panel 18. Even when the transmission operation image C22 is operated, the second transmission operation receiving unit 108 is configured to not receive the operation.
When the second recipient list D3 is operated to display the end thereof by the scroll bar C21, the confirmation screen display control unit 107 changes the transmission operation image C22 into an image surrounded by the solid line as illustrated in FIG. 7B. When the transmission operation image C22 is operated, the second transmission operation receiving unit 108 receives the operation. In this way, in this modified example, in a case where the second recipient list is unable to be fitted within a single screen, the information transmitting unit 106 does not transmit the information until the entire second recipient list is displayed. Therefore, in this modified example, even in a case where the second recipient list is unable to be fitted within a single screen, the information is not transmitted until the entire second recipient list is confirmed.
[2-2] Display Time of Second Recipient List
A display time of the second recipient list may be limited. In that case, the confirmation screen display control unit 107 displays the second recipient list until the time limit has elapsed. Thereafter, for example, the recipient list display control unit 102 switches the screen to display the first recipient list. In that case, the second transmission operation receiving unit 108 does not receive the operation of instructing the transmission of the information.
In this way, in a case where the operation of instructing the transmission of the information is not received when the predetermined time (time limit) has elapsed after the second recipient list is displayed, the information transmitting unit 106 does not transmit the information. Therefore, the confirmation of the second recipient list and the operation of instructing the transmission are prompted.

After the confirmation screen display control unit 107 displays the second recipient list until the time limit has elapsed, the second transmission operation receiving unit 108 may receive the operation of instructing the transmission of the information without switching the screen to display the first recipient list. In that case, when the predetermined time has elapsed after the second recipient list is displayed, the information transmitting unit 106 transmits the information even when the operation of instructing the transmission of the information is received. Therefore, after the time for confirming the recipient is provided, the information is transmitted regardless of whether there is an operation.

In addition, the time limit (the time for the confirmation screen display control unit 107 to display the second recipient list) may be changed. For example, the time limit may be a time having a period according to the quantity of recipients included in the second recipient list. The confirmation screen display control unit 107 changes the time limit using a time limit table which associates the quantity of recipients and the time limit.

Figures 8, 9:
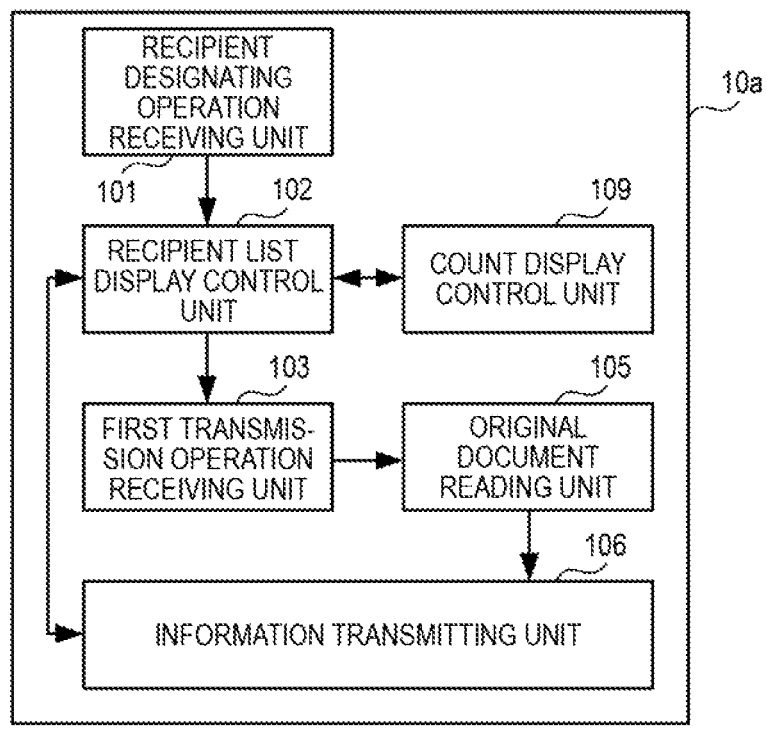
FIG. 8 is a diagram illustrating an example of a time limit table.
FIG. 9 is a diagram illustrating an example of a functional configuration to be realized by an image processing system in a modified example.

FIG. 8 illustrates an example of the time limit table. In the example of FIG. 8, the time limit "T1" is associated to the quantity of recipients "Less than threshold Th1". The time limit "T2 (T1<T2)" is associated to the quantity of recipients "Threshold Th1 or more". The quantity of recipients described herein is not limited to the count of recipients, but may be the number of characters for displaying the recipient. The confirmation screen display control unit 107 displays the second recipient list until the time limit associated in the time limit table with respect to the number of recipients included in the displayed second recipient list has elapsed. Therefore, the time for confirming the recipient according to the quantity of recipients is secured.

[2-3] Display of Number of Recipients

In the example, the attention for confirming the recipient is called to the user by displaying the second recipient list, but the information to be displayed for calling the attention is not limited thereto.

FIG. 9 illustrates an example of a functional configuration to be realized by an image processing system 10a according to this modified example. The image processing system 10a is provided with the recipient designating operation receiving unit 101, the recipient list display control unit 102, the first transmission operation receiving unit 103, the original document reading unit 105, the information transmitting unit 106, and a count display control unit 109. When the first recipient list is displayed, the recipient list display control unit 102 of this modified example supplies the first recipient list to the count display control unit 109. The count display control unit 109 displays information indicating the count of recipients included in the supplied first recipient list. The count display control unit 109 is an example of "second display control unit" of the invention.

Figure 10:
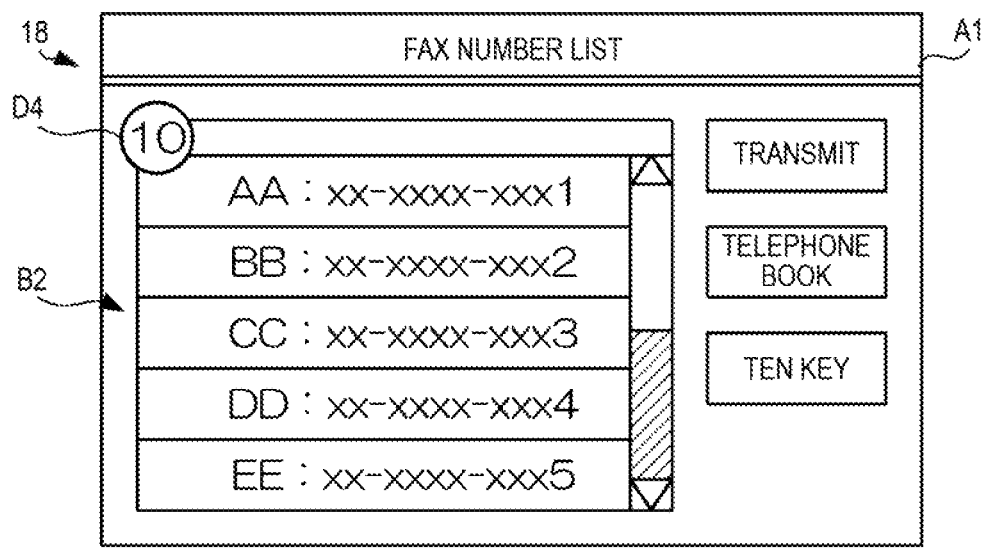
FIG. 10 is a diagram illustrating an example of the displayed first recipient list.

FIG. 10 illustrates an example of the displayed first recipient list. In the example of FIG. 10, the count display control unit 109 displays a count image D4 indicating the count "10" of recipients to be overlapped with the first recipient list B2 in the recipient list screen A1. Since the count image is displayed, the user can confirm whether the count of recipients to be designated by the user is coincident with the count of actually-designated recipients. When there is a deviation between these counts, the count image is used for the user to confirm and designate the rest recipients which are not yet designated while scrolling the first recipient list.

In this way, since the count image is displayed, the attention for confirming the recipient is called to the user when the information is transmitted to the recipient included in the list which is unable to be displayed within a single screen. The confirmation screen display control unit 107 of the example and the count display control unit 109 of this modified example cause the display unit to display recipient-related information which is related to the recipient included in the first recipient list (the second recipient list of the example and the count image of this modified example are an example of the recipient-related information), so that the attention for confirming the recipient is called.

In addition, since the count image is displayed to be overlapped with the first recipient list, it is easily indicate that the displayed count is the count of recipients included in the first recipient list, as compared to a case where the count image is displayed at a position away from the first recipient list. The information indicating the count of recipients may be displayed by a rectangular image indicating a screen different from the recipient confirmation screen such as a pop-up image other than the count image overlapped with the first recipient list. In any of these cases, it is desirable that the count of recipients be displayed to be easily attracted to the user.

In the example, the confirmation screen display control unit 107 displays the second recipient list as the recipient-related information, the count display control unit 109 displays the count image as the recipient-related information in this modified example. However, the recipient-related information of both examples may be displayed. In this case, the count display control unit 109 displays the count image in the recipient list screen A1, and the confirmation screen display control unit 107 displays the second recipient list in the recipient confirmation screen A2. Therefore, when the information is transmitted to the recipients included in the list which is unable to be displayed within a single screen, the attention for confirming the recipient is strongly called, as compared to a case where only one recipient-related information is displayed.

[2-4] Recipients Registered in Group

In a case where plural FAX numbers are registered in group, there may be called attention for confirming the recipients registered in a group.

Figure 11A:
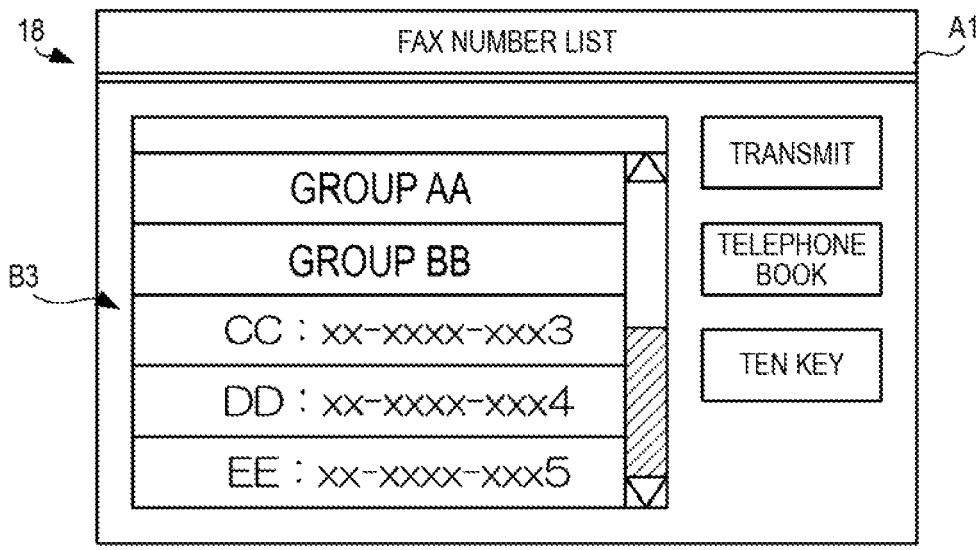
FIGS. 11A and 11B are diagrams illustrating an example of a recipient list screen and a recipient confirmation screen in a modified example.
Figure 11B:
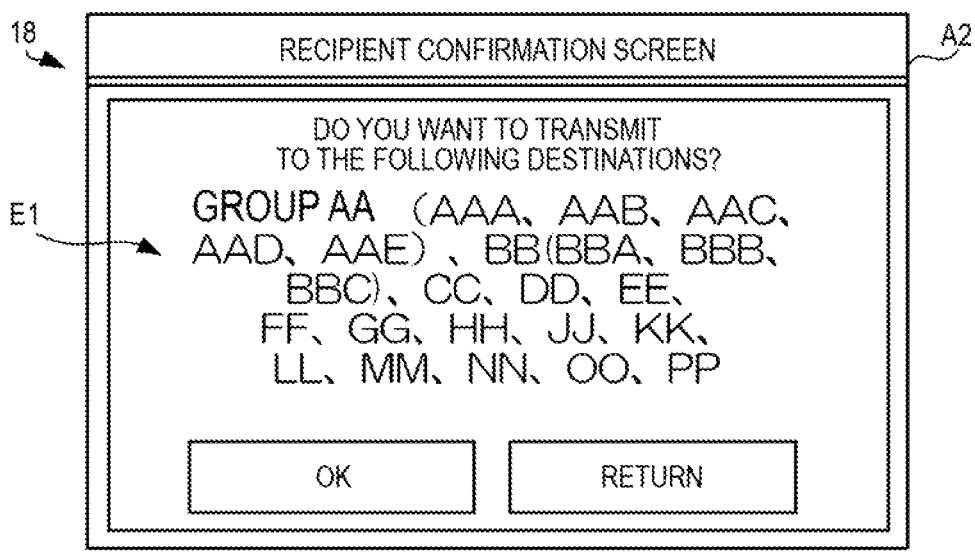

FIGS. 11A and 11B illustrate an example of the recipient list screen and the recipient confirmation screen of this modified example. In the example of FIG. 11A, the recipient list display control unit 102 displays a first recipient list B3 including the recipients ("Group AA" and "Group BB") in a group indicating the plural recipients in the operation panel 18 that is the display unit. In the example of FIG. 11B, the confirmation screen display control unit 107 displays in the operation panel 18 a list E1 of recipients in which the plural recipients included in these groups are separately indicated.

Specifically, the confirmation screen display control unit 107 displays the names "AAA AAB, AAC, AAD, AAE" of the recipients included in "Group AA", and displays the names "BBA, BBB, BBC" of the recipients included in the "Group BB". Hereinafter, a list of recipients separately indicating the plural recipients included in the groups displayed by the confirmation screen display control unit 107 will be referred to as a "third recipient list". The third recipient list is an example of "third list" of the invention.

The confirmation screen display control unit 107 displays the third recipient list so that the user also confirms the recipients included in a group in a case where a group of recipients indicating the plural recipients are included in the first recipient list. The confirmation screen display control unit 107 has displayed the third recipient list E2 including the names of the recipients included in the groups illustrated in the examples of FIGS. 11A and 11B, but the invention is not limited thereto. The FAX numbers of the recipients included in the groups may be displayed, or both the names and the FAX numbers may be displayed. When the amount of information to be displayed is large, the third recipient list may be not fitted within a single screen.

Figure 12:
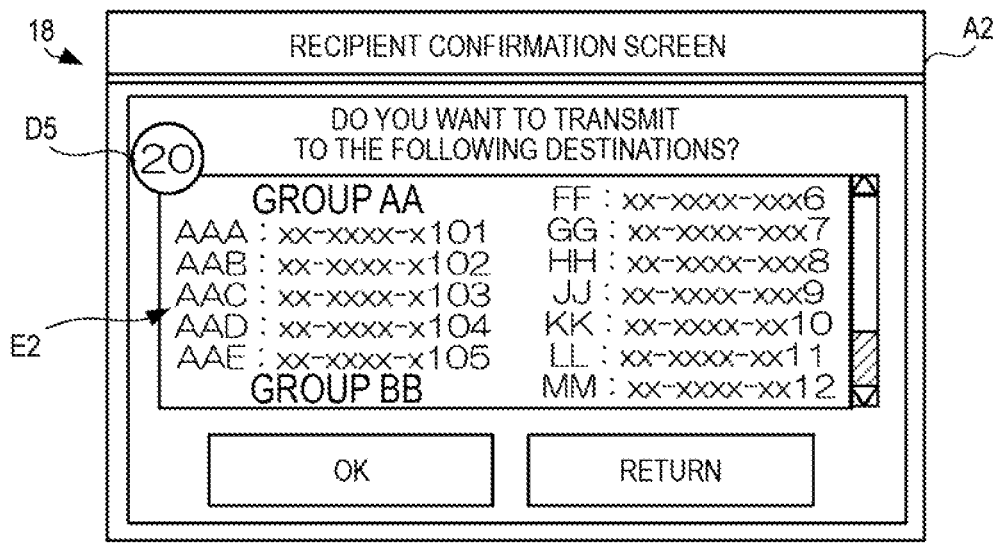
FIG. 12 is a diagram illustrating another example of the recipient confirmation screen in a modified example.

FIG. 12 illustrates an example of the recipient confirmation screen of this modified example. In the example of FIG. 12, in a case where the third recipient list E2 not included within a single screen of the operation panel 18 is displayed, the confirmation screen display control unit 107 displays also a count image D5 indicating the count of recipients included in the third recipient list E2. The count indicated by the count image D5 is a count (for example, the count of recipients of "Group AA" is not one but the count of recipients included in "Group AA" is summed up as five) obtained by separately adding up the recipients included in the groups.

Therefore, in a case where the third recipient list is unable to be fitted within a single screen of the display unit, the attention for confirming the recipients included in the third recipient list but not yet displayed is called to the user. For example, in a case where the recipients are not fitted within a single screen that is separately displaced as described in the example of FIG. 12, the confirmation screen display control unit 107 may display the list of recipients including only the names of the groups as the second recipient list. Therefore, the entire recipients are easily confirmed compared to the case where the third recipient list not fitted within a single screen is displayed.

In this case, when an operation of selecting the name of a displayed group, the confirmation screen display control unit 107 may display an individual recipient included in the selected group. In addition, in a case where there is left a space for displaying the recipients on the screen when the entire groups are displayed only with the names, the confirmation screen display control unit 107 may separately display the recipients of a part of the group.

Figure 13:
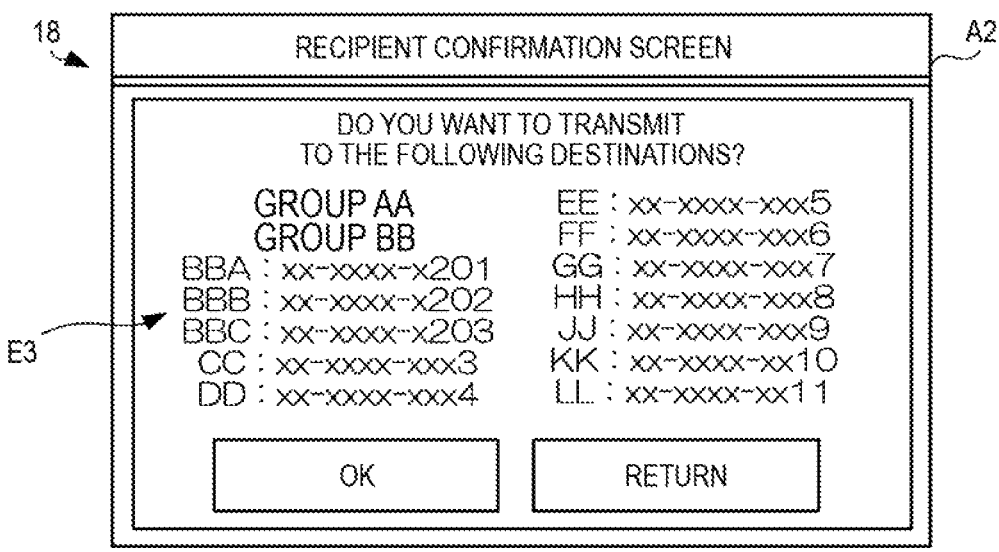
FIG. 13 is a diagram illustrating another example of the recipient confirmation screen in a modified example.

FIG. 13 illustrates another example of the recipient confirmation screen of this modified example. In the example of FIG. 13, the confirmation screen display control unit 107 displays a third recipient list E3 which includes only the name "Group AA", "Group BB" including the recipients such as "BBA: xx-xxxx-x201", and the respective recipients from "CC: xx-xxxx-xxx3" to "LL: xx-xxxx-xx11". Therefore, the entire recipients are easily confirmed, as compared to a case where the third recipient list not fitted within a single screen is displayed. Further, the user also confirms the individual recipients of a part of the group.

[12-5] Non-Display of Second and Third Recipient Lists

In the above examples, in a case where the first recipient list is unable to be fitted within a single screen, the confirmation screen display control unit 107 has necessarily displayed the second recipient list, but the invention is not limited thereto. In a case where the first recipient list is unable to be fitted within a single screen of the display unit, the confirmation screen display control unit 107 may not display the second recipient list when an operation of displaying the entire first recipient list is performed. The operation of displaying the entire first recipient list is, for example, an operation of moving down the scroll bar C4 illustrated in FIG. 3B once.

Figure 14:
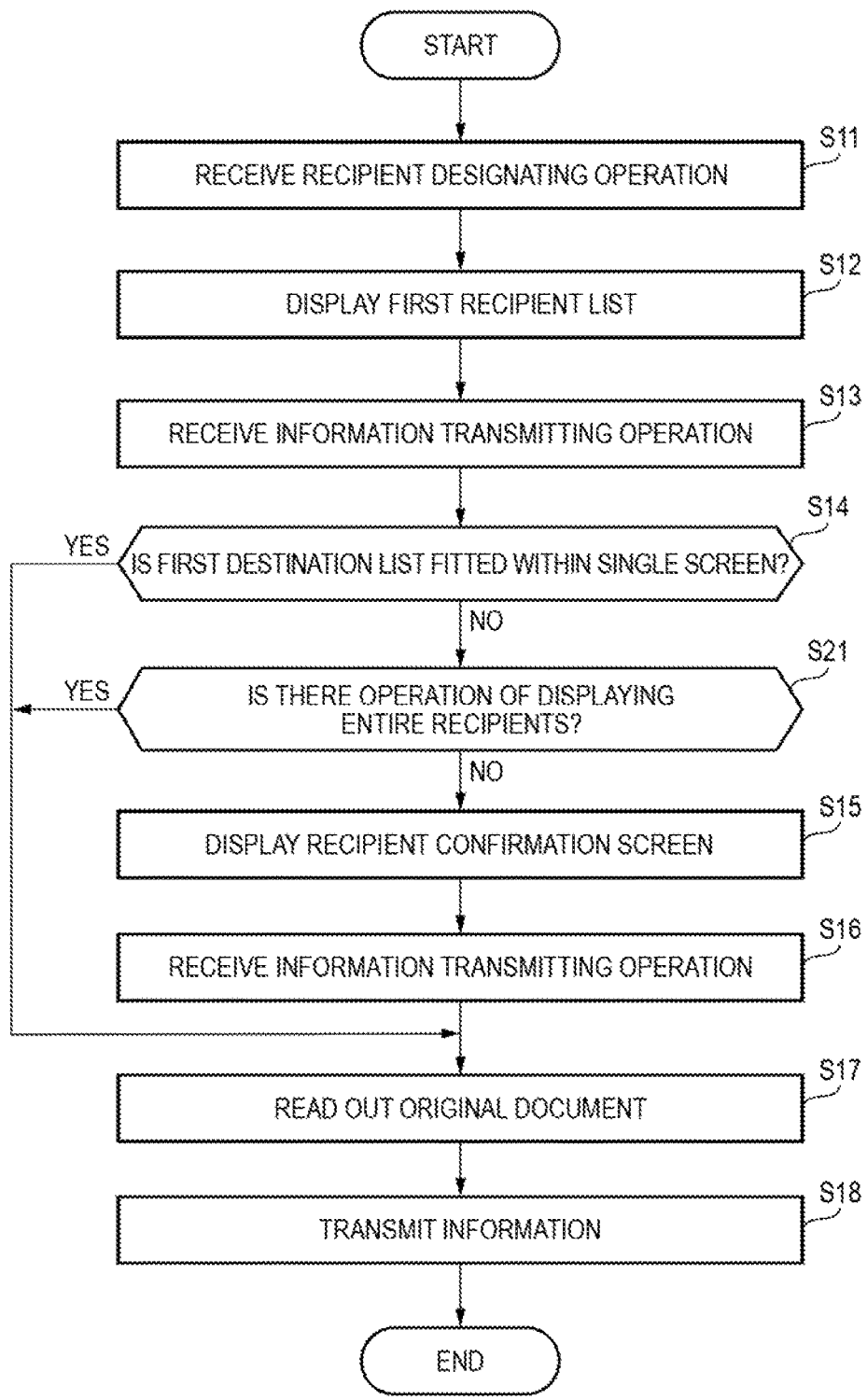
FIG. 14 is a diagram illustrating an example of an operational sequence in an information transmission process in a modified example.

FIG. 14 illustrates an example of an operational sequence in the information transmission process of this modified example. In the example of FIG. 14, the image processing system 10 performs the operations from Step S11 (receive recipient designating operation) to S14 (determine whether the first recipient list is able to be fitted within a single screen) illustrated in FIG. 6. Next, the image processing system 10 (the list display state determining unit 104) determines whether the operation of displaying the entire first recipient list is performed (Step S21).

In a case where it is determined in Step S21 that the operation of displaying the entire list is performed (YES), the image processing system 10 performs the operation (read the original document) of Step S17. In a case where it is determined in Step S21 that the operation of displaying the entire list is not performed (NO), the image processing system 10 performs the operation (display the recipient confirmation screen) of Step S15. Therefore, even when the operation of displaying the entire first recipient list is performed, the information is transmitted earlier than a case where the recipient-related information is displayed. The third recipient list may also be not displayed when the operation of displaying the entire first recipient list is displayed similarly to the second recipient list.

[2-6] Recipient of Transmission

In the above-described examples, the image data obtained by reading the original document has been transmitted using the FAX number as the recipient, but the invention is not limited thereto. For example, image data generated by a personal computer may be transmitted. In addition, the invention is not limited to the facsimile machine. For example, an electronic mail may be transmitted using an electronic mail address as the recipient, or an contribution document may be transmitted using an account of SNS (Social Networking Service) as the recipient. In any cases, when the information is transmitted to plural recipients, the invention is applied thereto to call the attention for confirming the recipient to the user in transmission of the information to the recipient included in a list which is unable to be displayed within a single screen.

[2-7] Recipient-Related Information Display Unit

The operation described in the above-described examples may be performed by another function.

Figure 15:
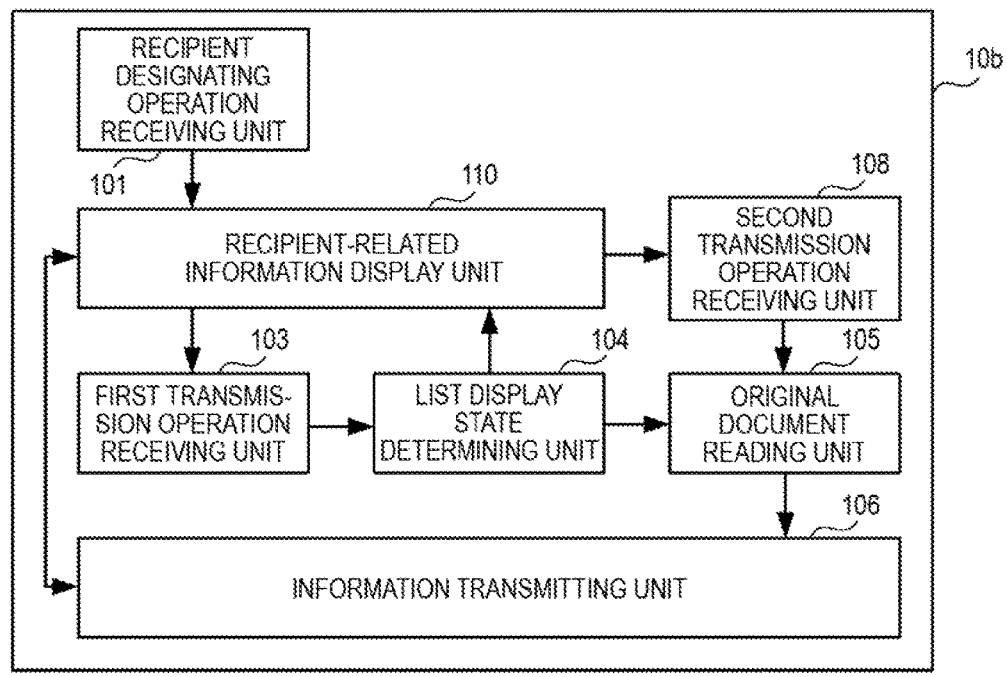
FIG. 15 is a diagram illustrating an example of a functional configuration realized by an image processing system in a modified example.

FIG. 15 illustrates a functional configuration to be realized by an image processing system 10b according to this modified example. The image processing system 10b is provided with the recipient designating operation receiving unit 101, a recipient-related information display unit 110, the first transmission operation receiving unit 103, the original document reading unit 105, the information transmitting unit 106, the confirmation screen display control unit 107, and the second transmission operation receiving unit 108.

The recipient-related information display unit 110 displays a list of plural recipients (for example, the first recipient lists B1 and B2 illustrated in FIGS. 3A and 3B) when plural recipients are designated to transmit the information. The recipient-related information display unit 110 is an example of "display unit" of the invention. In a case where the recipient-related information display unit 110 is informed from the list display state determining unit 104 (that is, the displayed list is unable to be fitted within a single screen), the recipient-related information display unit 110 displays the recipient-related information (for example, the second recipient list D1 illustrated in FIG. 4 or the count image D4 illustrated in FIG. 10) which is related to the plural recipients before transmitting the information.

Even in this modified example, since the recipient-related information display unit 110 displays the recipient-related information, the attention for confirming the recipient is called to the user when the information is transmitted to the recipient included in the list which is unable to be displayed on single screen.

[2-8] Display Form

The confirmation screen display control unit 107 may display the second recipient list to be fitted within a single screen by a method different from that of the example.

Figure 16:
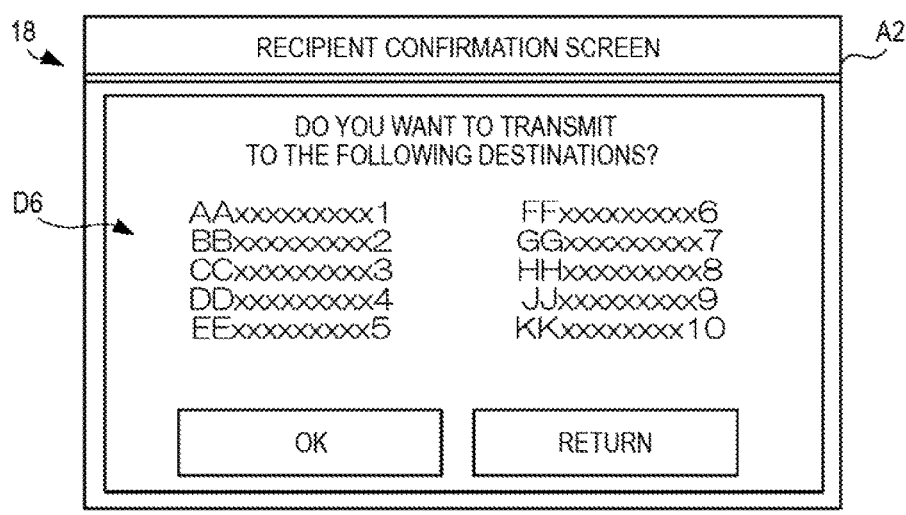
FIG. 16 is a diagram illustrating an example of the second recipient list in a modified example.

FIG. 16 illustrates an example of the second recipient list displayed in this modified example. In the example of FIG. 16, the confirmation screen display control unit 107 displays the recipient confirmation screen A2 which includes a second recipient list D6 including ten recipients "AAxxxxxxxxx1", "BBxxxxxxxxx2", . . . , "KKxxxxxxxxx10" in the operation panel 18.

In this example, the confirmation screen display control unit 107 changes the arrangement of the recipients included in the first recipient list B2, and changes a display form of these recipients (a display form not displaying ":" and "-") so as to be included in the second recipient list D6. Therefore, the second recipient list D2 is able to be fitted within a single screen. Alternatively, the confirmation screen display control unit 107 may change the arrangement of the recipients into a display form of displaying the recipient from the head by a predetermined number of characters, or a display form of displaying the recipient from the tail by a predetermined number of characters.

[2-9] Category of Invention

The invention is implemented as a an information processing method which realizes a process of the information processing apparatus, besides the information processing apparatus for displaying the first recipient list and the second recipient list or the information processing apparatus which performs the process of displaying the first recipient list and the second recipient list similarly to the above-described image processing system, and is implemented as a program for causing a computer to execute these processes. The program may be provided in a form of a recording medium such as an optical disk storing the program therein, or may be installed and usable by being downloaded to the computer through a communication line such as the Internet.

The foregoing description of the examples of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a CPU that performs:
controlling to display a first list including a plurality of recipients who are to receive transmitted information;
receiving an operation of instructing a transmission of information to the recipients;
after receiving the operation, when the first list is unable to fit within a single screen, controlling to display a recipient confirmation screen including recipient-related information related to the recipients within the single screen; and
transmitting the information to the recipients.

2. The information processing apparatus according to claim 1,
wherein the CPU controls a second list to be displayed as the recipient-related information, the second list including more recipients in the single screen than the displayed recipients included in the first list in the single screen.

3. The information processing apparatus according to claim 2,
wherein, when the second list is unable to fit within the single screen, the CPU does not transmit the information until the entire second list is displayed.

4. The information processing apparatus according to claim 2,
wherein the CPU displays the second list that is shown to fit within the single screen as the recipient-related information.

5. The information processing apparatus according to claim 4,
wherein the CPU controls the second list to fit within the single screen by omitting a character string of the recipients included in the first list to be included in the second list.

6. The information processing apparatus according to claim 4,
wherein the CPU changes at least any one of an arrangement or a display form of the recipients included in the first list to be included in the second list and controls the second list to fit within the single screen.

7. The information processing apparatus according to claim 4,
wherein the CPU shrinks the displayed recipients included in the first list to be included in the second list and controls the second list to fit within the single screen.

8. The information processing apparatus according to claim 2,
wherein the CPU does not transmit the information when an operation of instructing transmission of the information is not received when a predetermined time has elapsed after the second list is displayed.

9. The information processing apparatus according to claim 2,
wherein, when the predetermined time has elapsed after the second list is displayed, the CPU transmits the information even when an operation of instructing transmission of the information is not received.

10. The information processing apparatus according to claim 8,
wherein the time is a time period according to a quantity of recipients included in the second list.

11. The information processing apparatus according to claim 2,
wherein, when the first list is able to fit in the single screen and an operation onto the first operator is performed, the CPU transmits the information, and
wherein, when the first list is unable to fit within the single screen and the operation onto the first operator is performed, the CPU controls to display the recipient confirmation screen.

12. The information processing apparatus according to claim 11,
wherein the CPU controls to display a second operator together with the recipient-related information, and
wherein when an operation onto the second operator is performed, the CPU transmits the information.

13. The information processing apparatus according to claim 1,
wherein the CPU controls to display information indicating a count of recipients included in the first list as the recipient-related information.

14. The information processing apparatus according to claim 1,
wherein the first list includes a group of recipients indicating a plurality of recipients, and
wherein the CPU controls to display, as the recipient-related information, a third list indicating separately a plurality of recipients included in the group.

15. The information processing apparatus according to claim 14,
wherein, when the third list is unable to fit within the single screen, the CPU controls to display information indicating a count of recipients included in the third list, as the recipient-related information.

16. The information processing apparatus according to claim 15,
wherein the count of recipients is a count obtained by adding up the respective recipients included in the group.

17. The information processing apparatus according to claim 1,
wherein the CPU controls to display the recipient-related information to be overlapped with the first list.

18. The information processing apparatus according to claim 1,
wherein, when the first list is able to fit within the single screen, the CPU controls not to display the recipient-related information.

19. The information processing apparatus according to claim 1,
wherein, when the first list is unable to fit within the single screen, the CPU controls not to display the recipient-related information when an operation of displaying the entire first list is performed.

20. An information processing apparatus, comprising:
a CPU that transmits information and performs:
controlling to display, when a plurality of recipients to transmit the information are designated, a list including the plurality of recipients who are to receive the transmitted information;
receiving an operation of instructing a transmission of information to the recipients;
after receiving the operation, when the first list is unable to fit within a single screen, controlling to display a recipient confirmation screen including recipient-related information related to the plurality of recipients within the single screen.

21. The information processing apparatus according to claim 20,
wherein the recipient-related information includes more recipients in the single screen than the displayed recipients included in the list in the single screen.

22. The information processing apparatus according to claim 20,
wherein the recipient-related information includes the recipients included in the list in the single screen.

23. The information processing apparatus according to claim 20,
wherein the recipient-related information is shrunk such that the recipients included in the list are fitted within the single screen.

24. The information processing apparatus according to claim 23, wherein the recipient-related information is shrunk such that the recipients included in the list are fitted within the single screen by a change of at least any one of an arrangement and a display form of the recipients.

25. The information processing apparatus according to claim 20,
wherein the recipient-related information is a count of recipients included in the list.

* * * * *